UNITED STATES PATENT OFFICE.

CHARLES GOODYEAR, OF NEW HAVEN, CONNECTICUT.

IMPROVEMENT IN PROCESSES FOR MANUFACTURE OF INDIA-RUBBER.

Specification forming part of Letters Patent No. 3,633, dated June 15, 1844; Reissue No. 156, dated December 25, 1849.

*To all whom it may concern:*

Be it known that I, CHARLES GOODYEAR, now of the city and county of New Haven and State of Connecticut, have invented certain new and useful Improvements in the Manner of Preparing Fabrics of Caoutchouc or India-Rubber; and I do hereby declare that the following is a full, clear, and exact description of the principle or character which distinguishes them from all other things before known, and of the manner of making, compounding, and using the same.

Caoutchouc or india-rubber, which posseses so many valuable properties in the arts, is in its native state useless for many of the most important purposes for which it might be used, for the reason that it will become soft and sticky, and finally dissolve under the action of a moderate degree of heat and its other solvents, and as this substance also hardens and softens within the ranges of different temperatures of the atmosphere it is ill adapted to most of the manufacturing purposes; but as it is elastic and water-proof, as well as durable in a high degree, its introduction into a more common use for manufacturing purposes was deemed of great importance. This led the subscriber to apply all the time and means he could command and to persevere in his exertions to discover some method of preparing india-rubber by which its melting or softening property should be removed, neutralized, or destroyed, and its good qualities be retained. Seeing the great importance of this object I early and earnestly directed my attention to it. By the use of acid solutions, a process for which I obtained Letters Patent bearing date the 17th day of June, 1837, I obtained a partial result bearing on my grand object, but not sufficient to render it of general practical utility. Subsequently it was discovered that the presence of sulphur in the preparation and treatment of india-rubber had some effect to improve its qualities for certain purposes; and for this I, as assignee of Nathaniel Hayward, obtained Letters Patent bearing date the 24th day of February, 1839. The leading object of my exertions was to render india-rubber capable of resisting the action of heat and cold within the ranges of atmospheric temperature. In reflecting on this subject I became impressed with the idea that in the process of preparation of india-rubber it might be beneficially treated with heat at some degree beyond the highest degree of temperature in which the fabric would be used or exposed, and that such treatment might so change and alter it as to cause it to resist successfully all changes of temperature below that under which it was prepared. To this end I instituted and carried on a series of experiments, and finally accomplished the desired end—viz., that of rendering caoutchouc or india-rubber proof against the action of heat and cold below the temperature under which it is cured, and also for all practical purposes against the action of all its known solvents; but as this substance, when subjected to heat by itself, could not be cured or deprived of its sticky or soluble properties, I was led to experiment upon it in connection with other substances and found that when subjected to the action of a high degree of artificial heat in connection with some other substance or substances I could effect this important object. When compounded with sulphur, by the application of a high degree of artificial heat, I obtained good results, and when compounded with sulphur and the carbonate of lead I obtained the best results; but I found during my experiments with numerous substances that whatever substance or substances be used in connection with the india-rubber the grand result sought after could not be obtained without the action of a high degree of artificial heat, which is the great agent in my method of curing.

In view of the peculiar properties of this substance and the objects to be gained, the nature of the first part of my invention consists in curing caoutchouc or india-rubber, when combined with or in the presence of sulphur, by submitting the same to the action of a high degree of artificial heat at a temperature above solar heat—say from 212° to 350°, or thereabout—whereby this substance becomes so changed in its properties as to resist, without material change, the variations of temperature below that under which it is curved, and also the action of the expressed and essential oils and its other known solvents; and the second part of my invention consists in preparing and curing the triple compound of caoutchouc or india-rubber, sulphur, and a carbonate or other salt or oxide of lead for the purposes above pointed out.

To enable others skilled in the arts most nearly allied to this to prepare caoutchouc or india-rubber after my improved plan, I will here describe the mode of procedure by which I have been enabled to obtain the best results.

The articles which I combine with the india-rubber in forming my improved fabric are sulphur and white lead, which materials may be employed in varying proportions; but that which I have found to answer best, and to which it is desirable to approximate in forming the compound, is as follows: I take twenty-five parts, by weight, of india-rubber, five parts of sulphur, and seven parts of white lead. The india-rubber I usually dissolve in spirits of turpentine or other essential oils; and the white lead and sulphur also I grind in the ordinary way of grinding paint. These three articles, when thus prepared, may, when it is desired to form a sheet by itself, be evenly spread upon any smooth surface or upon glazed cloth, from which it may be readily separated; but I prefer to use for this purpose the cloth made according to the present specification, as the compound spread upon this article separates therefrom more cleanly than from any other. Instead of dissolving the india-rubber in the manner above set forth, and the sulphur and white lead prepared as above directed, they may be incorporated with the substance of the india-rubber by the aid of heated cylinders or calender-rollers, by which it may be brought into sheets of any required thickness; or it may be applied so as to adhere to the surface of cloth or of leather of various kinds. This mode of applying and producing the sheet-caoutchouc by means of rollers is well known to manufacturers. To destroy the odor of sulphur in fabrics thus prepared, I wash the surface with a solution of potash, or with vinegar, or with a small portion of essential oil, or other solvent of sulphur. When the india-rubber is spread upon the firmer kinds of cloth or of leather, it is subject to peel therefrom by a moderate degree of force, the gum letting go the fiber by which the two are held together. I have therefore devised another improvement in the manufacture not herein claimed, by which this tendency is in a great measure corrected, and by which, also, the sheet-gum, when not attached to cloth or leather, is better adapted to a variety of purposes than when not prepared by this improved mode, which is as follows: After laying a coat of gum compounded as above set forth on any suitable fabric, I cover it with a bat of cotton wool as it is delivered from the doffer of a carding-machine, and this bat I cover with another coat of gum—a process which may be repeated two or three times, according to the required thickness of the goods. When this compound of india-rubber, sulphur, and white lead, whether to be used alone in the state of sheets or applied to the surface of any other fabric, has fully dried, either in a heated room or by exposure to the sun and air, the goods are to be subjected to the action of a high degree of artificial heat, which will admit of considerable variation, according to the thickness and previous preparation of the articles to be treated—say from 212° to 350° degrees of Fahrenheit's thermometer, but for the best effect approaching as near as may be to 270°. As a general rule, the usual kinds of fabrics should be exposed to this artificial heat from two to six hours, dependent on the thickness of the sheet of gum and the proportions of the compound. The greater the proportion of lead in the compound employed, usually the shorter time required to cure it. The temperature should be gradually raised to the maximum to avoid blistering. The operator should from time to time examine the goods while under treatment, to ascertain whether they have been sufficiently cured, and should be careful to avoid the blistering, which will frequently take place if the heat be applied too suddenly. This heating process may be effected by running the fabrics over a heated cylinder; but I prefer to expose them to an atmosphere of artificial heat of the proper temperature, which may be best done by the aid of an oven properly constructed, and, when for cloths, with openings through the sides of which the sheets of india-rubber or web of cloth may be passed by means of suitable rollers; but the operator may communicate the heat in any suitable manner or form. When this process is performed upon the above compound, it must be allowed to remain upon the cloth upon which it is placed in order to sustain it, as the compound so far softens during the operation as not to be capable of supporting its weight without such aid. If the exposure be to a temperature exceeding 270°, it must continue for a very brief period.

Any other mode of reducing and dissolving the india-rubber and compounding it with the other substances may be substituted for that above described; and although I have described the compound as consisting of india-rubber, sulphur, and white lead, I do not mean to limit myself to this compound when a high degree of artificial heat is used, as good results may be and have been obtained by me by dispensing with the lead, and it is immaterial, so far as regards the principle of my invention, whether the sulphur is incorporated with the india-rubber by admixture in the solid form, or spread on the surface thereof, or combined therewith in the gaseous or other form previous to or during the process of curing by heat.

The leading feature of my invention, and that which chiefly constitutes the substance or essence of its usefulness, is the discovery of the effects produced on india-rubber by the action of artificial heat at a temperature above that to which the fabric would be exposed in ordinary or common use.

Although I have above only described the mode of preparing and curing sheets of india-rubber, it will be obvious that my method of curing is applicable to articles of any desired form.

What I claim as my invention, and desire to secure by Letters Patent, is—

1. The curing of caoutchouc or india-rubber by subjecting it to the action of a high degree of artificial heat, substantially as herein described, and for the purpose specified.

2. The preparing and curing the compound of india-rubber, sulphur, and a carbonate or other salt or oxide of lead by subjecting the same to the action of artificial heat, substantially as herein described.

CHARLES GOODYEAR.

Witnesses:

WILLIAM JUDSON,
SETH P. STAPLES,
CHS. M. KELLER.